United States Patent
Ito (10) Patent No.: US 9,247,091 B2
(45) Date of Patent: Jan. 26, 2016

(54) IMAGE FORMING APPARATUS, CONTROL METHOD FOR IMAGE FORMING APPARATUS, AND PROGRAM THAT STOP SUPPLY OF POWER TO A PRINTER UNIT AND SUPPLY OF POWER TO A SCANNER UNIT BASED ON ELAPSED TIMES

(71) Applicant: CANON KABUSHIKI KAISHA, Tokyo (JP)

(72) Inventor: Yoshiharu Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/638,456

(22) Filed: Mar. 4, 2015

(65) Prior Publication Data

US 2015/0181067 A1    Jun. 25, 2015

Related U.S. Application Data

(63) Continuation of application No. 14/192,535, filed on Feb. 27, 2014, now Pat. No. 9,001,353.

(30) Foreign Application Priority Data

Mar. 6, 2013    (JP) .................. 2013-044574

(51) Int. Cl.
*H04N 1/00*    (2006.01)
*G06F 3/12*    (2006.01)
*G06F 1/32*    (2006.01)
*G06K 15/00*    (2006.01)

(52) U.S. Cl.
CPC ............. *H04N 1/00904* (2013.01); *G06F 1/32* (2013.01); *G06F 3/1221* (2013.01); *G06F 3/1229* (2013.01); *G06K 15/4055* (2013.01); *H04N 1/00891* (2013.01); *G06F 3/121* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,227,652 B2 * | 6/2007 | Cronch et al. | 358/1.14 |
| 7,787,796 B2 * | 8/2010 | Nosaki | 399/88 |
| 2002/0097589 A1 * | 7/2002 | Jansen et al. | 363/21.14 |
| 2010/0053706 A1 * | 3/2010 | Jasinski et al. | 358/498 |
| 2011/0176160 A1 * | 7/2011 | Manabe | 358/1.14 |

\* cited by examiner

*Primary Examiner* — Jeremiah Bryar
(74) *Attorney, Agent, or Firm* — Canon USA, Inc. IP Division (57) ABSTRACT

An image forming apparatus includes a first processing unit configured to execute a first type function, a second processing unit configured to execute a second type function different from the first type function, and a power supply unit configured to supply power to the first processing unit and the second processing unit, wherein a storage unit stores a first guaranteed time during which a power supply to the first processing unit is maintained and a second guaranteed time during which a power supply to the second processing unit is maintained, and a control unit configured to stop the power supply to the first processing unit when the stored first guaranteed time elapses and to stop the power supply to the second processing unit when the stored second guaranteed time elapses.

14 Claims, 9 Drawing Sheets

IMAGE FORMING APPARATUS, CONTROL METHOD FOR IMAGE FORMING APPARATUS, AND PROGRAM THAT STOP SUPPLY OF POWER TO A PRINTER UNIT AND SUPPLY OF POWER TO A SCANNER UNIT BASED ON ELAPSED TIMES

CROSS-REFERENCE TO RELATED APPLICATIONS

This application is a Continuation of U.S. patent application Ser. No. 14/192,535 filed Feb. 27, 2014 (now U.S. Pat. No. 9,001,353), which claims priority from Japanese Patent Application No. 2013-044574 filed Mar. 6, 2013. Each of U.S. patent application Ser. No. 14/192,535 and Japanese Patent Application No. 2013-044574 is hereby incorporated by reference herein in its entirety.

BACKGROUND OF THE INVENTION

1. Field of the Invention

The present invention relates to an image forming apparatus, a control method for the image forming apparatus, and a recording medium.

2. Description of the Related Art

A conventional image forming apparatus prioritizes user convenience and simplification of a control operation. With such prioritization, the conventional image forming apparatus does not employ a configuration in which the start and stop of power supply are individually performed for each component (e.g., a print apparatus and a scanner apparatus) of the image forming apparatus.

In recent years, however, an image forming apparatus is expected to provide a higher power-saving effect. Japanese Patent Application Laid-Open No. 2001-201986 discusses an image forming apparatus in which a power supply to each component is individually controlled by a function operated inside the image forming apparatus. Such a configuration is expected to enable the image forming apparatus to have further power-saving effect.

The image forming apparatus includes consumable parts including an operation part, such as a mechanical relay and a motor, and a part, for example for a light source, which reaches a high temperature. The consumable part usually has an upper limit usage time of the number of power on and off operations with which the operation quality can be guaranteed.

However, the power supply may be controlled in the image forming apparatus having the configuration discussed in Japanese Patent Application Laid-Open No. 2001-201986 such that the power supply is turned on and off repeatedly in a relatively short time. It is easy to imagine that such control causes the consumable part to exceed the number of endurance limit times thereof in a shorter time period than an estimated lifespan of the image forming apparatus.

In this case, the operation quality of the component of the image forming apparatus cannot be guaranteed. As a result, a lifespan of the image forming apparatus becomes shortened, causing technical difficulty in achieving both of further power-saving effect and prolonged lifespan of the image forming apparatus.

SUMMARY OF THE INVENTION

The present invention is directed to a configuration satisfying a power-saving requirement for an entire apparatus and achieving a lifespan of each unit to be extended by controlling a power supply to each unit according to a function selected by a user.

According to an aspect of the present invention, an image forming apparatus includes a first processing unit configured to execute a first type function, a second processing unit configured to execute a second type function different from the first type function, a power supply unit configured to supply power to the first processing unit and the second processing unit, a storage unit configured to store a first guaranteed time during which a power supply to the first processing unit is maintained and a second guaranteed time during which a power supply to the second processing unit is maintained, and a control unit configured to stop the power supply to the first processing unit having executed the first type function based on the first guaranteed time stored in the storage unit, and to stop the power supply to the second processing unit having executed the second type function based on the second guaranteed time stored in the storage unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
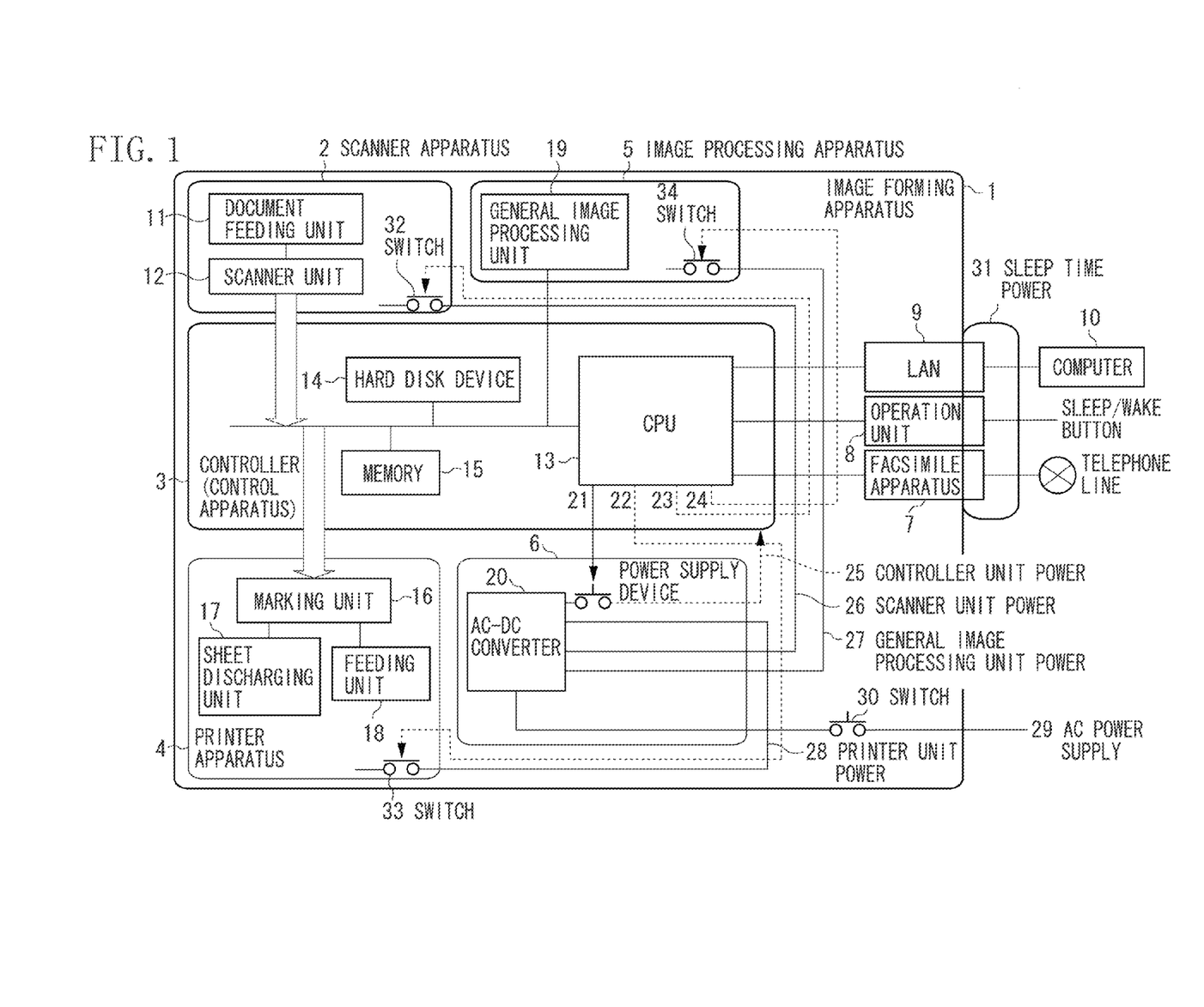
FIG. 1 is a block diagram illustrating an example of an image forming apparatus.

FIG. 1 is a block diagram illustrating an example of an image forming apparatus according to a present exemplary embodiment. In the present exemplary embodiment, a multifunction peripheral (MFP) performing multifunction image processing is described as an image forming apparatus 1.

In the present exemplary embodiment, the image forming apparatus 1 includes a scanner apparatus 2, a printer apparatus 4, and an image processing apparatus 5, as a plurality of processing units for performing different types of functional processing. The multifunction image processing is performed by a combination of these processing units. Moreover, the image forming apparatus of the present exemplary embodiment includes a power supply device 6 for supplying power to each of the processing units.

In the image forming apparatus 1 according to the present exemplary embodiment, a user can select functional processing by using a user interface (UI) screen displayed on an operation unit 8. The selectable functional processing includes copy function processing, facsimile function processing, transmission function processing, and box function processing.

In FIG. 1, the scanner apparatus 2 optically reads an image from a document, and converts the read image into a digital image. A controller 3 executes a job on the image forming apparatus 1 by issuing instructions to a facsimile (FAX) apparatus 7 and each module connected to the controller 3. The facsimile apparatus 7 transmits a digital image to a telephone line.

The printer apparatus 4 outputs a digital image to a paper medium. The operation unit 8 includes hard keys, a liquid crystal display (LCD) unit and the like to receive an operation instruction provided to the image forming apparatus 1.

A hard disk device 14 stores digital images and control programs, for example. The image forming apparatus 1 can input and output a digital image from and to a computer 10 via a local area network (LAN) 9. Moreover, the image forming apparatus 1 can issue a job and an instruction for a device.

The scanner apparatus 2 includes a document feeding unit 11 which automatically and successively feeds a bundle of document sheets. The scanner apparatus 2 also includes a scanner unit 12. The scanner unit 12 optically scans an image on a document, converts the scanned image into a digital image, and transmits the converted image data to the controller 3.

The printer apparatus 4 includes a feeding unit 18, a marking unit 16, and a sheet discharging unit 17. The feeding unit 18 can successively feed sheets one by one from a sheet bundle, and the marking unit 16 causes image data to be printed on the sheet fed from the feeding unit 18. The sheet discharging unit 17 discharges the sheet on which the image data is printed.

The controller 3 includes a central processing unit (CPU) 13. The controller 3 transmits and receives image data to and from the scanner apparatus 2 and the printer apparatus 4, and stores the image data. In the controller 3, the image data received from the scanner apparatus 2 is temporarily stored in a memory 15, and then stored in the hard disk device 14, thereby completing scanning and storing the image.

The controller 3 temporarily stores the image data in the memory 15 from the hard disk device 14, and transmits the image data from the memory 15 to the printer apparatus 4. This enables the image forming apparatus 1 to print out the image.

The image forming apparatus 1 includes the image processing apparatus 5 including a general image processing unit 19. For example, the image processing apparatus 5 can cause the general image processing unit 19 to reduce image data stored in the memory 15 and store the data again in the memory 15. The general image processing unit 19 is used in various situations as necessary.

The image forming apparatus 1 includes the operation unit 8 controlled by the controller 3. The CPU 13 interprets an operator operation via the operation unit 8 or an instruction from the LAN 9, so that the image forming apparatus 1 can execute various jobs.

Examples of functional processing of the image forming apparatus 1 are hereinafter described. In the present exemplary embodiment, selectable functional processing includes copy function processing, facsimile function processing, transmission function processing, and box function processing as described below. Each of the functional processing is executable in the image forming apparatus 1 according to the present exemplary embodiment.

(Copy Function)
The image forming apparatus 1 stores an image read from the scanner apparatus 2 in the hard disk device 14. Simultaneously, the image forming apparatus 1 prints the image using the printer apparatus 4.

(Image Transmission Function)
The image forming apparatus 1 stores an image read from the scanner apparatus 2 in the hard disk device 14, and transmits the image to the computer 10 via the LAN 9.

(Image Storage Function)
The image forming apparatus 1 stores an image read from the scanner apparatus 2 in the hard disk device 14, and transmits or prints the image as necessary.

(Image Printing Function)
The image forming apparatus 1 analyzes, for example, page description language data transmitted from the computer 10, and prints the analyzed data using the printer apparatus 4.

(FAX Reception Print)
The image forming apparatus 1 stores a FAX image received from the FAX apparatus 7 in the hard disk device 14. Simultaneously, the image forming apparatus 1 prints the FAX image using the printer apparatus 4.

(FAX Transfer Processing)
The image forming apparatus 1 stores a FAX image received from the FAX apparatus 7 in the hard disk device 14. Simultaneously, the image forming apparatus 1 transfers the FAX image to the computer 10 via the LAN 9.

(FAX Memory Reception Processing)
The image forming apparatus 1 stores a FAX image received from the FAX apparatus 7 in the hard disk device 14, and waits for an operator to view the FAX image.

(FAX Transmission Processing)
The image forming apparatus 1 stores an image read from the scanner apparatus 2 in the hard disk device 14. Simultaneously, the image forming apparatus 1 transmits the image to a public line from the facsimile apparatus 7.

The hard disk device 14 is interposed in most of above-described cases. In this way, the image forming apparatus 1 can recover from a job failure and an abnormal situation such as power interruption.

The power supply device 6 supplies power to each unit in the image forming apparatus 1.

When the image forming apparatus 1 is being powered off, an alternating current (AC) power supply 29 is insulated by a switch 30.

When the switch 30 is turned on, an AC power is supplied to an alternating current direct current (AC-DC) converter 20, and a DC power is generated. The image forming apparatus 1 can control the entire apparatus thereof with four independent power supplies according to instructions of the CPU 13. More specifically, the CPU 13 can control ON/OFF of a power supply of a controller unit power 25 by a switch 21.

Similarly, a switch 22, a switch 23, and a switch 24 are used for controlling ON/OFF of power supplies for a printer unit power 28, a scanner unit power 26, and a general image processing unit power 27, respectively.

The CPU 13 uses these switches 21 through 24 for properly supplying the power to a necessary unit in the image forming apparatus 1. In the present exemplary embodiment, each of the processing units serving as a first processing unit and a second processing unit includes a switch for connecting and disconnecting a power supply. When the copy function is selected, the CPU 13 controls the switches such that the power is supplied to each of the scanner apparatus 2, the printer apparatus 4, and the image processing apparatus 5.

Each power state is described below.
(Sleep State)

A sleep state is a power state in which power consumption of the image forming apparatus 1 is reduced as low as possible.

A peripheral device of the CPU 13 is in a general suspend state (e.g., an advanced configuration and power interface (ACPI)-S3), whereas only a job detectable portion (a sleep time power 31) is in an energized state. Accordingly, the power consumption of the entire image forming apparatus 1 can be very low.

Specifically, the CPU 13 stores a state of the image forming apparatus 1 in the memory 15, and turns off the power of the controller unit power 25 including the power thereof by using the switch 21.

In such a state, the CPU 13 stops the operation thereof, whereas a power supply of the sleep time power 31 is turned on as hardware, so that the CPU 13 recognizes only job reception.

For example, when a job is received via the LAN 9, when the FAX apparatus 7 receives an incoming call, and when the operation unit 8 is operated, the controller unit power 25 is turned on as hardware.

The CPU 13 reads out the state of the image forming apparatus 1 stored in the memory 15. Then, the CPU 13 performs resetting to cause the image forming apparatus 1 to return to the state immediately before the power supply of the controller unit power 25 is turned off, and the image forming apparatus 1 shifts to a standby state.

Since most of the hardware cannot operate in the sleep state, only shifting to the standby state is performed. After being shifted to the standby state, the image forming apparatus 1 receives a job.
(Standby State)

A standby state is a power state in which the controller unit power 25 is being in an energized state.

The image forming apparatus 1 receives an operator's operation through the operation unit 8, and a job via the LAN 9.

Since the printer unit power 28, the scanner unit power 26, and the general image processing unit power 27 are being turned off, the CPU 13 turns on a power supply for each of the devices to be used by using the switches 22 through 24 before executing a prescribed job. For example, the CPU 13 turns on a power supply for each of the devices according to a job type as described below.
(Copy Function)

The CPU 13 turns on the scanner unit power 26, the general image processing unit power 27, and the printer unit power 28, so that the above-described copy function is performed.
(Image Transmission Function)

The CPU 13 turns on the scanner unit power 26 and the general image processing unit power 27, and read image data is transmitted.
(Image Storage Function)

The CPU 13 turns on the scanner unit power 26 and the general image processing unit power 27, and read image data is stored.
(Box Printing Function)

The CPU 13 turns on the printer unit power 28 and the general image processing unit power 27, and various image data pieces are printed.
(FAX Reception Print)

The CPU 13 turns on the printer unit power 28 and the general image processing unit power 27. After general image processing is executed on a FAX image received by the FAX apparatus 7, the processed FAX image is printed.

(FAX Transfer Processing)

The CPU 13 turns on only the general image processing unit power 27. After general image processing is executed on data received by the FAX apparatus 7, the processed FAX data is transferred.
(FAX Memory Reception Processing)

The CPU 13 turns on only the general image processing unit power 27. After general image processing is executed on data received by the FAX apparatus 7, the processed data is stored in the hard disk device 14.
(FAX Transmission Processing)

The CPU 13 turns on the scanner unit power 26 and the general image processing unit power 27, so that FAX image data read by the scanner apparatus 2 is transmitted to a public line.

When the job is completed, the power supply to the device is turned off. This enables only the devices needed for the job to be in an energized state only when the device is used, thereby reducing the power consumed during the standby state.

Figure 2:
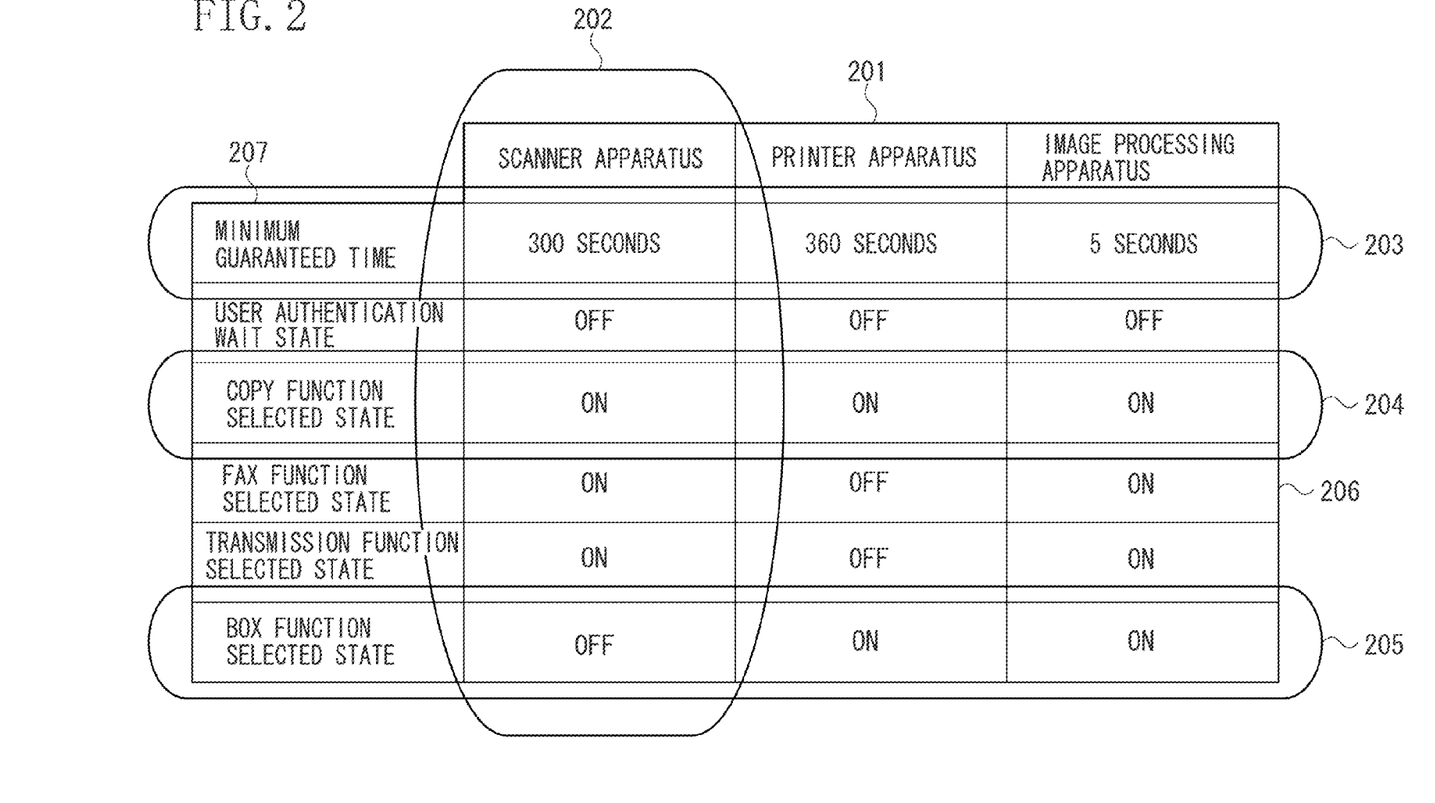
FIG. 2 is a table illustrating a power-on state of each unit of the image forming apparatus illustrated in FIG. 1.

FIG. 2 is a table illustrating a power-on state of each unit of the image forming apparatus 1 illustrated in FIG. 1. This diagram illustrates an example in which a state of a power supply system of each component in the image forming apparatus 1 is associated with a minimum guaranteed time according to a function selected via the operation unit 8. The minimum guaranteed time is a power-on state time period to be maintained for each component. Specifically, a guaranteed time and a power shift state are stored in a state storage unit, which will be described below. The guaranteed time is a time period for which a power supply for each processing unit is continuously performed. The power shift state indicates a state in which a power supply to each processing unit is shifted to ON or OFF according to a selected function. A power supply state of each unit is described below. The minimum guaranteed time and the power shift state illustrated in FIG. 2 are stored as a table in the hard disk device 14. However, the minimum guaranteed time and the power shift state may be stored in another storage medium, for example, a flash read only memory (ROM) or an electrically erasable programmable read only memory (EEPROM).

Moreover, after power is supplied to the image forming apparatus 1, the table is read out from the hard disk device 14 to the memory 15 so that the table is managed to be available for the CPU 13.

A copy function selected state 204 in FIG. 2 corresponds to a case where a user has selected a copy function. In the copy function selected state 204, FIG. 2 illustrates that all of the components (i.e., the scanner apparatus 2, the printer apparatus 4, and the image processing apparatus 5) are in a powered-on state.

Figure 8:
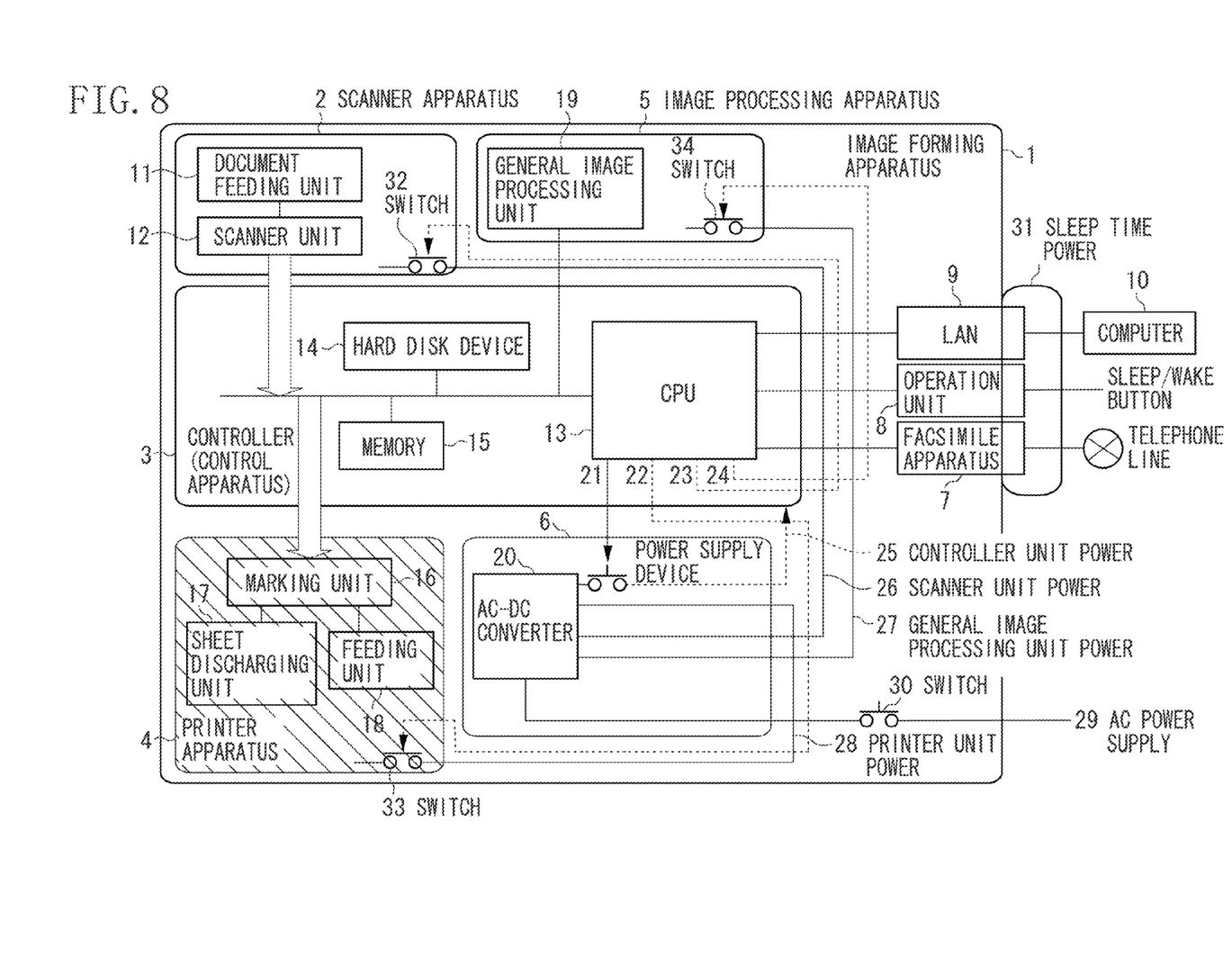
FIG. 8 is a block diagram illustrating a power supply state of the image forming apparatus.

Similarly, a FAX function selected state 206 corresponds to a case where the user has selected a FAX function. In the FAX function selected state 206, FIG. 2 illustrates that the scanner apparatus 2 and the image processing apparatus 5 are in a power-on state, while the printer apparatus 4 is in a power-off state (FIG. 8). In addition to these states, FIG. 2 illustrates a user authentication wait state, which is a waiting period for a function to be selected by a user, a transmission function selected state, and a box function selected state 205.

Next, the minimum guaranteed time is described.

A guaranteed time represents a minimum time period for which a power-on state is maintained when a power-off state is shifted to the power-on state.

In FIG. 1, the scanner apparatus 2 includes a switch 32, and the printer apparatus 4 includes a switch 33. Each of these switches 32 and 33 includes a mechanical relay. Since such a mechanical relay is a consumable part, there is the number of endurance limit times, which guarantees operation quality of the relay. The relay generally has the number of endurance limit times of approximately 200,000 times, although the number of endurance limit times may be affected by an operation voltage, an electric current, and an ambient temperature.

When it is presumed that a power supply is turned on and off 10 times per hour while the image forming apparatus 1 operates eight hours per day. In this case, the relay performs ON/OFF operations for 29,200 times per year, and thus reaches the number of endurance limit times in less than seven years.

When it is presumed that the image forming apparatus 1 has a lifespan of such a length, the image forming apparatus 1 needs to maintain a power-on state for six minutes. Thus, a guaranteed time period of the printer apparatus 4 becomes 360 seconds.

However, in a case where the guaranteed time is longer, a time period before the image forming apparatus 1 shifts to a power-saving state becomes longer. Since the longer guaranteed time causes an increase in power consumption of the image forming apparatus 1, it is desired that the guaranteed time be as short as possible. A semiconductor relay may be used instead of the mechanical relay to deal with such a situation. Since the semiconductor relay does not include a mechanically movable member, the semiconductor relay is known to have the greater number of endurance limit times as almost unlimited.

In the present exemplary embodiment, the image processing apparatus 5 includes a switch 34 which includes a semiconductor relay. Thus, the image processing apparatus 5 is set to have a minimum guaranteed time 207 of five seconds as illustrated in FIG. 2. The guaranteed time 207 illustrated in FIG. 2 for each of the first and the second type functions is an example. The guaranteed time 207 may be set according to specifications of those members in the image forming apparatus 1.

Figure 3:
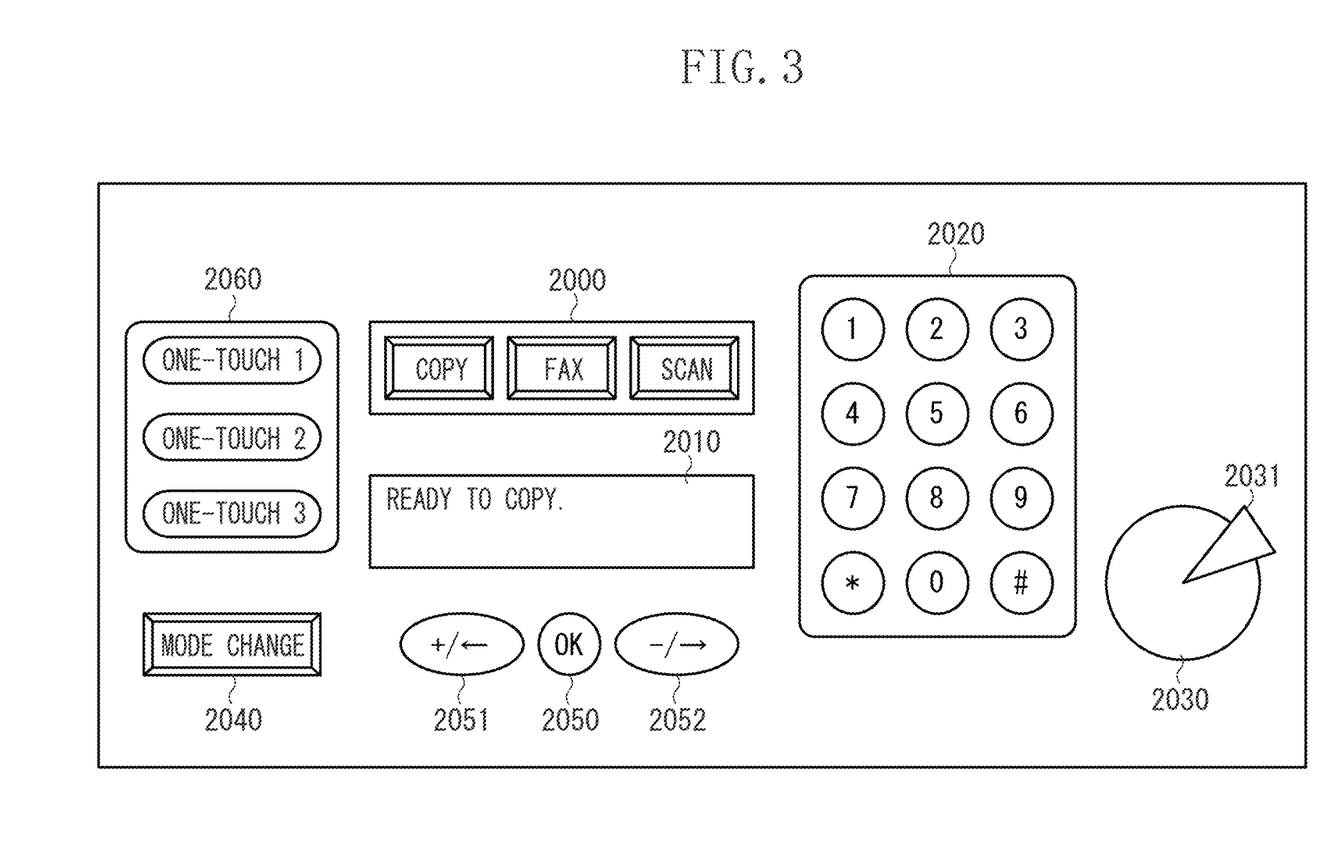
FIG. 3 is a plane view illustrating a function selection screen displayed on an operation unit of the image forming apparatus illustrated in FIG. 1.

FIG. 3 is a plane view illustrating a function selection screen displayed on the operation unit 8 illustrated in FIG. 1.

The operation unit 8 of the present exemplary embodiment includes function selection buttons 2000, a numeric keypad 2020, a copy start button 2030, an operation stop button 2031, and a mode change button 2040. Moreover, the operation unit 8 includes data input keys 2051 and 2052, and one-touch dial buttons 2060. The operation unit 8 also includes an LCD display unit 2010 capable of displaying various user interfaces. A user uses the function selection button 2000 of the operation unit 8 to select a function to be executed.

In FIG. 3, the function selection buttons 2000 are used when the user selects various functions, which are settable in the image forming apparatus 1. The LCD display unit 2010 displays a device state and a data input state. The LCD display unit 2010 of the present exemplary embodiment can display a character string in two lines. The user uses the numeric keypad 2020 to input numeric data and a FAX destination number.

The user selects the copy start button 2030 and the operation stop button 2031 to activate and stop a device function. The user uses the mode change button 2040 to change a device operation mode. Specifically, the mode change button 2040 is used when an operation mode, such as registration setting mode and a normal operation mode, needs to be changed.

In the registration setting mode, the user uses the data input keys 2051 and 2052 to input characters. The user selects a character displayed on the LCD display unit 2010 by using the data input keys 2051 and 2052. The user selects an OK button 2050 to confirm a displayed content.

The one-touch dial button 2060 is used when the user registers a FAX destination. In FIG. 3, for example, a user can register up to three FAX destinations. The user registers a telephone number of a frequently used destination in each button. Such registration enables the user to omit an input of the telephone number of the frequently used destination, thereby simplifying an operation.

Figure 4:
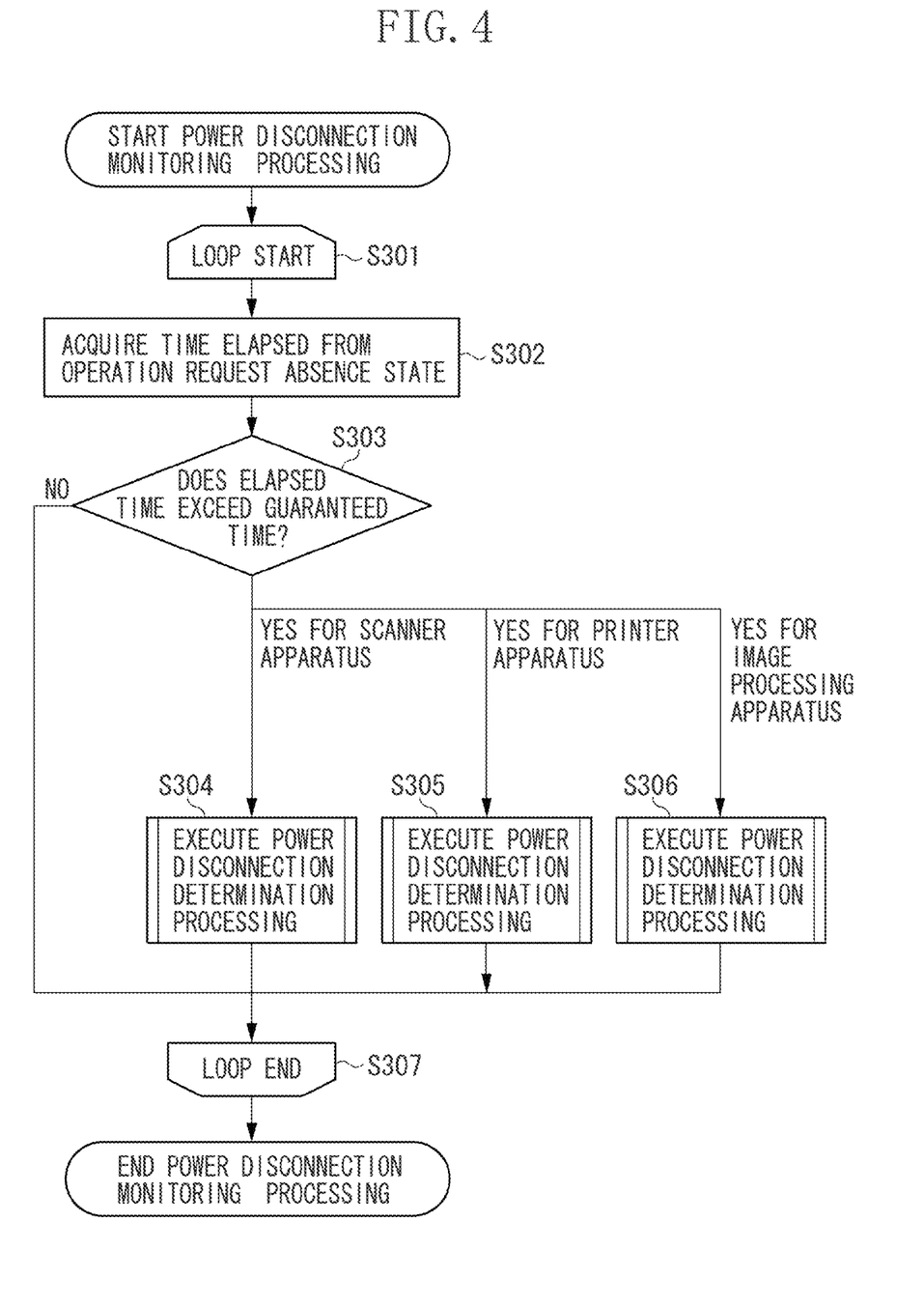
FIG. 4 is a flowchart illustrating a control method for the image forming apparatus.

FIG. 4 is a flowchart illustrating a control method for the image forming apparatus 1 according to the present exemplary embodiment. The processing in this flowchart is not executed if the image forming apparatus 1 is executing print processing, or a user has just finished operating a user interface unit. The processing is periodically executed at intervals of unused states, for example, every five seconds. In a case where the user performs an operation, or a job is remotely executed in the course of the processing, the processing is ended by interruption. The CPU 13 performs each processing in the flowchart by executing the control program stored in the hard disk device 14. In the flowchart, the CPU 13 repeatedly executes step S301 through step S307 unless the processing is ended by interruption. Hereinafter, control processing for preventing deterioration in operation quality of a consumable part of the image forming apparatus 1 is described in detail. This control processing suppresses a case where a power supply is repeatedly turned on and off in a relatively short time for each component of the image forming apparatus 1. Moreover, the CPU 13 refers to each of stored guaranteed times for the corresponding processing units, and controls the power supply such that the power supply for each processing unit is maintained. Such control processing is also described. In the present exemplary embodiment, each processing unit has a corresponding function. The scanner apparatus 2 has a scanner function, the printer apparatus 4 has a print function, and the image processing apparatus 5 has an image processing function. The user can set beforehand which component of the image forming apparatus 1 serves as a first processing unit or a second processing unit. Alternatively, the user can set that the first processing unit and the second processing unit are changeable. Such settings can be made optionally. Moreover, guaranteed times for the respective first and second processing units are called a first guaranteed time and a second guaranteed time for the sake of simplicity.

In step S302, the CPU 13 acquires a time elapsed from the beginning of the processing. Since the elapsed time is not necessarily be an absolute time, an internal counter register (not illustrated) inside the CPU 13 is used in the present exemplary embodiment. Even if the absolute time is applied, similar processing can be executed.

In step S303, the CPU 13 compares the acquired elapsed time with a guaranteed time of each component of the image forming apparatus 1. The elapsed time represents a time elapsed from a state in which there is not an operation request. The guaranteed time of each component is stored in the memory 15 as minimum guaranteed times 203 illustrated in FIG. 2. The scanner apparatus 2, the printer apparatus 4, and the image processing apparatus 5 have the minimum guaranteed times of 300 seconds, 360 seconds, and 5 seconds, respectively.

If the CPU 13 determines that the elapsed time acquired in step S302 exceeds the guaranteed time of the scanner apparatus 2 (YES FOR SCANNER APPARATUS in step S303), the operation proceeds to step S304. In step S304, the CPU 13 executes power disconnection determination processing for the scanner apparatus 2. The power disconnection determination processing will be described in detail below.

Similarly, if the CPU 13 determines that the acquired elapsed time exceeds the guaranteed time of the printer apparatus 4 (YES FOR PRINTER APPARATUS in step S303), the operation proceeds to step S305. If the CPU 13 determines that the acquired elapsed time exceeds the guaranteed time of the image processing apparatus 5 (YES FOR IMAGE PROCESSING APPARATUS in step S303), the operation proceeds to step S306.

On the other hand, if the CPU 13 determines that the acquired elapsed time does not exceed any of the guaranteed times (NO in step S303), the operation proceeds to step S307. Subsequently, the CPU 13 repeatedly executes the processing from step S301 to step S307.

Figure 5:
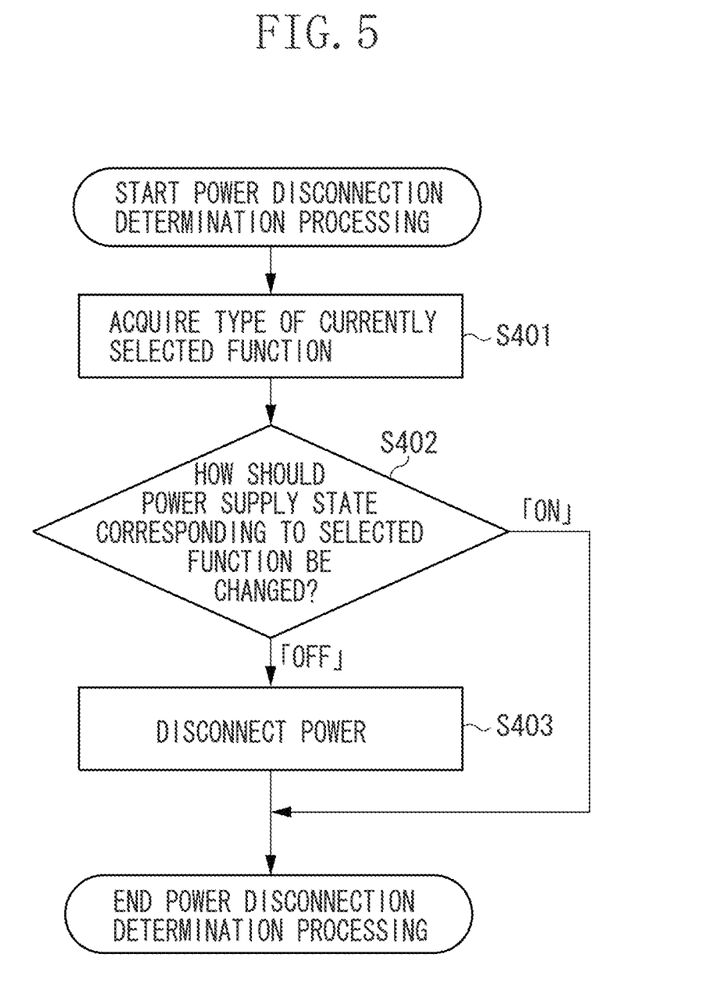
FIG. 5 is a flowchart illustrating a control method for the image forming apparatus.

FIG. 5 is a flowchart illustrating a control method for the image forming apparatus 1 according to the present exemplary embodiment. The flowchart describes in detail the power disconnection determination processing executed by the CPU 13 in steps S304, S305, and S306 illustrated in FIG. 4.

The processing illustrated in FIG. 5 is executed in a case where the guaranteed time has elapsed while there is no user operation or no job execution in step S303 of the flowchart illustrated in FIG. 4.

Processing operations in steps S304, S305, and S306 are similar to one another except for a referring item in the table during the processing, and a switch to be used when power supply control is actually performed.

The flowchart illustrated in FIG. 5 is described by using the power disconnection determination processing (step S304 in FIG. 4) of the scanner apparatus 2 as an example.

In step S401, the CPU 13 acquires a type of a function, which is currently selected by a user, of the image forming apparatus 1. The selected function is, for example, a copy function and a FAX function. It is presumed that the copy function is selected in the description below.

In step S402, the CPU 13 determines how to change a power supply state of the scanner apparatus 2 corresponding to the selected function. The CPU 13 performs such determination by referring to the table illustrated in FIG. 2.

Figure 6:
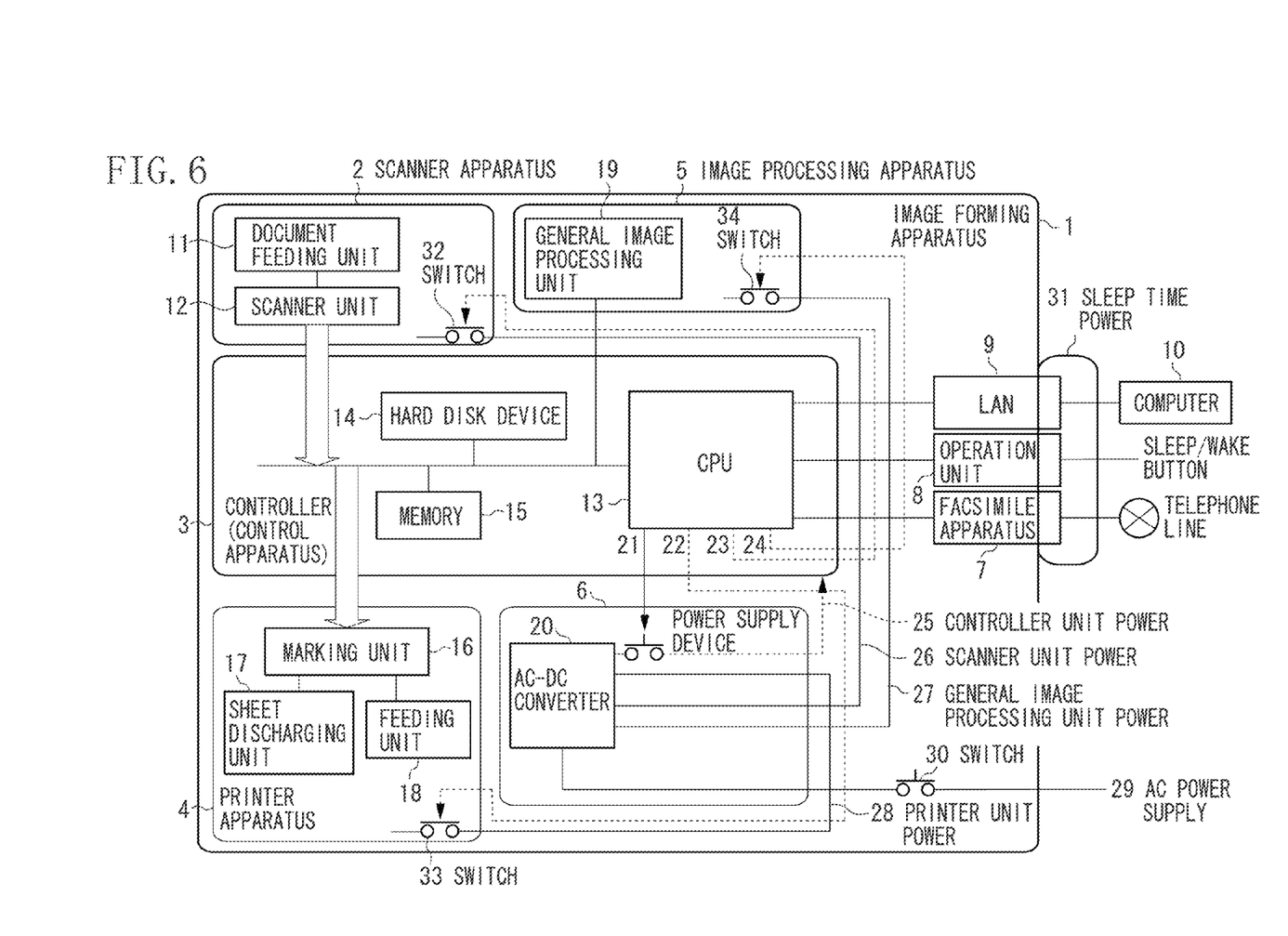
FIG. 6 is a block diagram illustrating a power supply state of the image forming apparatus.

In the copy function selected state 204, a power supply state 202 for each function of the scanner apparatus 2 is internally managed as "ON". Consequently, the CPU 13 determines that the power supply state remains ON (ON in step S402), and then the power disconnection determination processing ends. A power state of the entire image forming apparatus 1 at this time is illustrated in FIG. 6.

Next, the power disconnection determination processing performed when a function selected in step S401 is in the box function selected state 205 is described.

Figure 7:
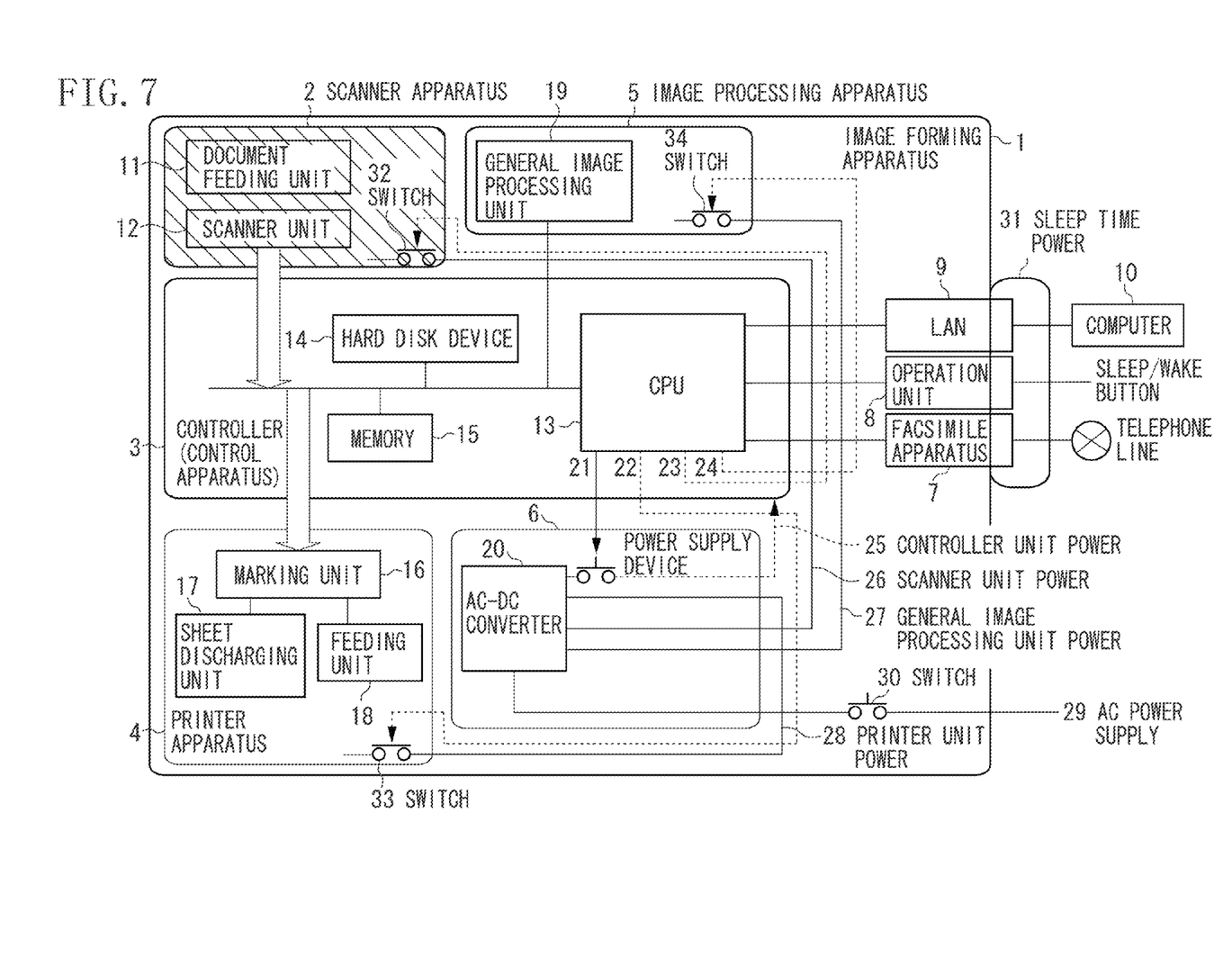
FIG. 7 is a block diagram illustrating a power supply state of the image forming apparatus.

In step S402, the CPU 13 refers to the table illustrated in FIG. 2. Since the power supply state 202 for each function of the scanner apparatus 2 in the box function selected state 205 is internally managed as "OFF" (OFF in step S402), the CPU 13 determines that the power disconnection determination processing proceeds to step S403. In step S403, the CPU 13 executes power disconnection processing. The switch 32 inside the scanner apparatus 2 illustrated in FIG. 1 is turned "OFF", and thus a power supply to the scanner apparatus 2 is disconnected. A power state of the entire image forming apparatus 1 at this time is illustrated in FIG. 7. Moreover, in the FAX function selected state and the transmission function selected state, if the CPU 13 determines that a power supply state is "OFF" in step S402 illustrated in FIG. 5, a power supply to the printer apparatus 4 is disconnected as illustrated in FIG. 8.

Therefore, the CPU 13 executes the control processing as illustrated in the flowcharts in FIGS. 4 and 5 to individually disconnect a power supply to each component of the image forming apparatus 1 only if a guaranteed time of each component has elapsed while the image forming apparatus 1 is not used for a certain time period.

Figure 9:
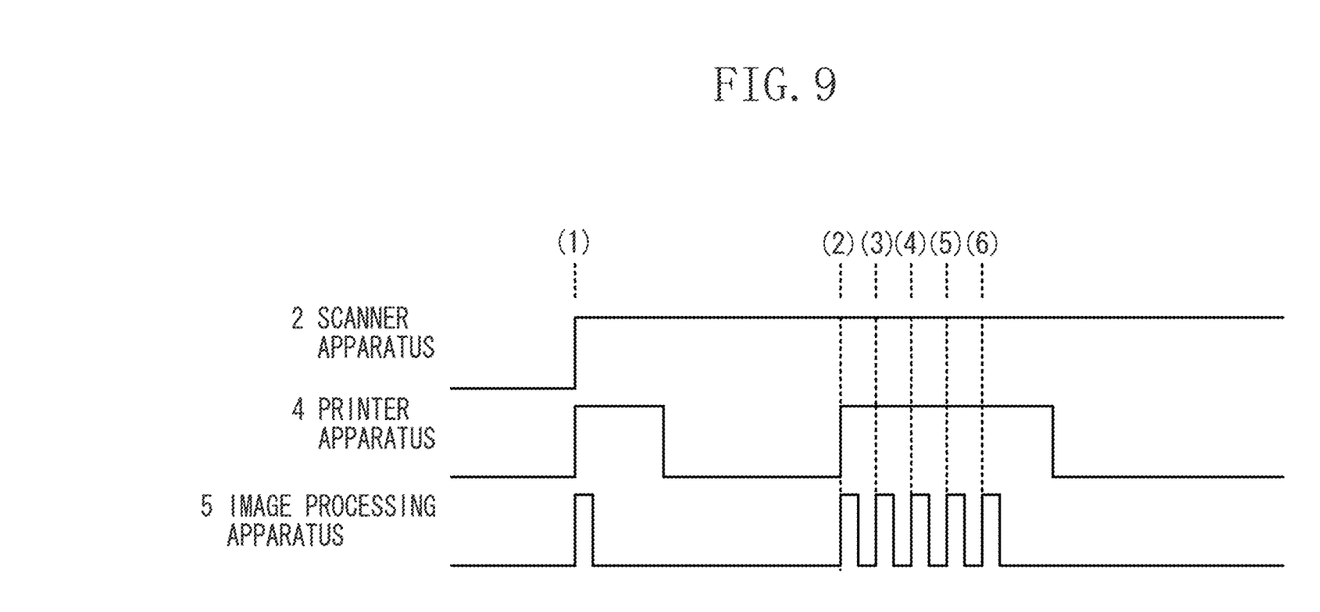
FIG. 9 is a timing chart illustrating a power supply state of the image forming apparatus illustrated in FIG. 1.

FIG. 9 is a timing chart illustrating a power supply state of the image forming apparatus illustrated in FIG. 1. This example chart illustrates a change in a power supply state of each component of the image forming apparatus 1 according to the control described with reference to FIGS. 4 and 5.

In FIG. 9, a horizontal axis indicates a lapse of time, and timings (1) through (6) indicate operation timings of a user. In a case where the user operates the operation unit 8 to select a FAX function at the timings (1), (2), (4), and (6) and a copy function at the timings (3) and (5), power supply states change as illustrated in FIG. 9.

With using the copy function and the FAX function, a power supply state of the scanner apparatus 2 remains the same, whereas a power supply state of each of the printer apparatus 4 and the image processing apparatus 5 changes as illustrated in FIG. 2. Moreover, since the image processing apparatus 5 has a shorter guaranteed time than the printer apparatus 4, the CPU 13 controls a timing such that the power supply to the image processing apparatus 5 is disconnected earlier than that to the printer apparatus 4. Moreover, as illustrated in FIG. 9, the user can repeatedly select functions in a short time from the timings (2) through (6). Even in such a case, the CPU 13 compares an elapsed time with the guaranteed time in step S303, and if the elapsed time is within the guaranteed time, the power disconnection processing is not performed, so that a power supply state is maintained. Such processing prevents a decrease in durability of the consumable part.

According to the above-described processing, therefore, when a user selects a function to be executed, power supply control is executed according to the present exemplary embodiment. Such control suppresses a case where a power supply is repeatedly turned on and off in a relatively short time with respect to each component of the image forming apparatus 1, thereby preventing a deterioration in operation quality of the consumable part.

Therefore, the power saving of the image forming apparatus 1 is achieved, and at the same time, lifespan of the image forming apparatus 1 is prolonged in a well-balanced manner. Thus, user convenience is markedly improved.

The exemplary embodiments of the present invention can be performed by a processing apparatus (a CPU, a processor), such as a personal computer. In such a case, the processing apparatus executes software (a program) acquired through a network or various storage media.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   a printer unit;
   a scanner unit;
   a power supply unit configured to supply power to the printer unit and the scanner unit;
   a storage unit configured to store a first guaranteed time, and a second guaranteed time different than the first guaranteed time; and
   a control unit configured to perform control to stop the power supply to the printer unit when the first guaranteed time elapses after start of execution of copy processing in which an image of a document read by the scanner unit is formed on a sheet by the printer unit, and to stop the power supply to the scanner unit when the second guaranteed time elapses after the start of the execution of the copy processing.

2. The image forming apparatus according to claim 1, wherein the first guaranteed time is longer than the second guaranteed time.

3. The image forming apparatus according to claim 1, wherein the control unit performs control to maintain the power supply to the printer unit before the first guaranteed time elapses, and to maintain the power supply to the scanner unit before the second guaranteed time elapses.

4. The image forming apparatus according to claim 1, wherein when the copy processing is to be performed, the control unit performs control to supply the power to the printer unit and the scanner unit.

5. The image forming apparatus according to claim 1, wherein when received fax data is to be printed, the control unit performs control to supply the power to the printer unit, and not to supply the power to the scanner unit.

6. The image forming apparatus according to claim 1, wherein when fax data is to be transmitted, the control unit performs control to supply the power to the scanner unit, and not to supply the power to the printer unit.

7. The image forming apparatus according to claim 1, further comprising a storage unit configured to store image data,
   wherein when printing is to be performed using the image data stored in the storage unit, the control unit performs control to supply the power to the printer unit, and not to supply the power to the scanner unit.

8. An image forming apparatus comprising:
   a printer unit;
   a scanner unit;
   a power supply unit configured to supply power to the printer unit and the scanner unit;
   a storage unit configured to store a first guaranteed time, and a second guaranteed time different from the first guaranteed time; and
   a control unit configured to perform control to supply the power to the printer unit and the scanner unit in response to a user selecting a copy function in which an image of a document read by the scanner unit is formed on a sheet by the printer unit, to stop the power supply to the printer unit when the first guaranteed time elapses after start of the power supply to the printer unit in response to the user selecting the copy function, and to stop the power supply to the scanner unit when the second guaranteed time elapses after the start of the power supply to the scanner unit in response to the user selecting the copy function.

9. The image forming apparatus according to claim 8, wherein the first guaranteed time is longer than the second guaranteed time.

10. The image forming apparatus according to claim 8, wherein the control unit performs control to maintain the power supply to the printer unit before the first guaranteed time elapses, and to maintain the power supply to the scanner unit before the second guaranteed time elapses.

11. The image forming apparatus according to claim 8, wherein when the copy function is to be performed, the control unit performs control to supply the power to the printer unit and the scanner unit.

12. The image forming apparatus according to claim 8, wherein when received fax data is to be printed, the control unit performs control to supply the power to the printer unit, and not to supply the power to the scanner unit.

13. The image forming apparatus according to claim 8, wherein when fax data is to be transmitted, the control unit performs control to supply the power to the scanner unit, and not to supply the power to the printer unit.

14. The image forming apparatus according to claim 8, further comprising a storage unit configured to store image data,
   wherein when printing is to be performed using the image data stored in the storage unit, the control unit performs control to supply the power to the printer unit, and not to supply the power to the scanner unit.

* * * * *